United States Patent Office

2,903,477
Patented Sept. 8, 1959

2,903,477

ESTERIFICATION PROCESS FOR PRODUCING PURIFIED PLASTICIZER ESTERS

Vincent L. Hughes, Clark Township, Isidor Kirshenbaum, Westfield, and Alan Alvin Schetelich, Cranford, N.J., assignors to Esso Research and Engineering Company, a corporation of Delaware No Drawing. Application March 27, 1957
Serial No. 648,765

14 Claims. (Cl. 260—475)

This invention relates to a process of preparing plasticizers having improved color properties by the reaction of an acidic component and alcohol in the presence of ammonium ion source.

The ever expanding use of plastic materials such as vinyl chloride polymers or copolymers, polyvinyl acetate, cellulose esters, acrylate and methacrylate resins, rubbers such as the emulsion copolymers of butadiene and styrene or acrylonitrile, or the copolymers of isobutylene with small amounts of a diolefin such as isoprene, has created a large demand for suitable plasticizers. Branched chain alkyl organic esters and particularly alkyl phthalic acid esters and more particularly octyl and decyl phthalate, as well as the esters of maleic acid, adipic acid, azelaic acid, sebacic acid or their anhydrides, have been known to be extremely satisfactory plasticizers for the aforementioned high molecular weight materials. For the esterification acid reacting compounds having two acid radicals such as dicarboxylic acids and/or their anhydrides are suitable reactants with the desired alcohol.

These plasticizer esters are generally prepared by the esterification of a suitable alcohol, e.g. $C_8$–$C_{14}$ alcohol, with an acidic reactant such as phthalic acid, the anhydride thereof or any of the acidic reactants noted above. In general, the alcohol is employed in amounts from stoichiometric to substantial excesses and heated, preferably in the presence of an acid catalyst such as benzene sulfonic acid, toluene sulfonic acid, naphthalene sulfonic acid or the like. Entrainers or azeotrope formers may be employed during the reaction to effect the removal of water at lower temperatures since it is known that severe operating conditions, including high temperatures and strongly acidic catalysts, tend to magnify any discoloration which may result from contaminants in the alcohol reactant. Entrainers usually employed are the low boiling aromatics such as benzene, toluene, xylene and the like, paraffinic hydrocarbons of suitable boiling points, e.g. heptene and octane or olefinic materials such as diisobutylene, etc. Various processes applicable to the manufacture of these plasticizer esters are known and this invention does not depend on any specific one. Also numerous acid and alcohol reactants are known and are amply set forth in the abundant prior art.

One of the primary difficulties encountered in the manufacture of plasticizer esters, especially where $C_8$ and $C_{10}$ alcohols are employed, is the failure to obtain colorless products even when relatively high purity reactants are employed. It has been known for some time that sulfur contaminants result in off-color ester products and more recently it was discovered that carbonyl compounds and carbonyl-forming compounds such as acetals affect to a marked degree the color of the final ester product. To counteract the discoloring effect, especially of carbonyls, on the ester most commercial esterification processes employ mild conditions and carefully control the reaction medium. Thus mild p-toluene sulfonic acid is employed in lieu of sulfuric acid and the reaction mixture is kept free of oxygen usually by blanketing the system with $CO_2$ or other inert gases. Para-toluene sulfonic acid is considerably more expensive than sulfuric acid and more sulfonic acid is necessary due to its lower order of activity. Therefore it would be a considerable advance in the art and a substantial savings in manufacturing cost if sulfuric acid could be employed with carbonyl contaminated alcohols and if the reaction could be run open to the atmosphere. Even employing toluene sulfonic acid, a carbonyl contaminated alcohol will cause degradation and discoloration which is inhibited by the use of ammonium ion source.

At present a principal source of alcohols for the manufacture of plasticizer esters is via the oxo or carbonylation route where an olefin is reacted with carbon monoxide and hydrogen in the presence of a catalyst, generally a cobalt salt, at elevated temperatures and pressures to form an aldehyde product having one more carbon atom than the starting olefin. This aldehyde product is then freed of cobalt and subsequently hydrogenated to form the corresponding alcohol product. While the sulfur contaminants introduced into the product by either the olefin or the hydrogenation catalyst, etc., may be cleaned up effectively by caustic washing, extensive distillation and similar treatments, the final alcohol product obtained in general will contain sufficient amounts of aldehyde and/or carbonyl-forming compounds such as acetals to seriously affect the ultimate color qualities of any ester prepared therefrom. Oxo alcohols will contain generally from 0.01 to 0.2 wt. percent or higher of carbonyl or carbonyl-forming compounds. Dimer alcohols prepared by a modified oxo route are also valuable as intermediates in the preparation of esters and are subject to the same contamination problems as the ordinary oxo alcohols.

One potential commercial source of alcohols suitable for the preparation of plasticizers is via the alkyl metal route. This relatively new process comprises basically the addition of ethylene or other olefin onto a metal alkyl such as aluminum triethyl or aluminum triisobutyl to prepare high molecular weight aluminum trialkyl compounds which in turn may be oxidized to form the corresponding aluminum alcoholates and finally hydrolyzed to form the alcohol. The alcohols obtained via this new route also contain substantial quantities of carbonyl compounds which are either not separable from the alcohol or separable only with extensive costly treatment. Alternatively the alkyl metal may be made directly by reaction of olefin with metal and $H_2$. An alkyl metal of this type is easily converted to alcohols in the manner described above. This invention will find application when alcohols having carbonyl or carbonyl-forming contaminants regardless of the source are employed. For example, 2-ethyl hexanol prepared by the condensation of acetaldehyde may be employed with improved results by operating in accordance with this invention.

It is therefore a primary object of this invention to prepare plasticizers which are colorless or near colorless by an esterification process, especially one wherein sulfuric acid is employed as the catalyst. If desired this reaction may be run open to the atmosphere. The above objects are accomplished by carrying out this sulfuric acid catalyzed reaction in the presence of ammonium ion, preferably added in the form of an ammonium ion source which includes ammonium salts as well as ammonia. Typical ammonium salts of inorganic acids which may be employed include ammonium sulfate, sulfite, acid sulfate, chloride, bromide, carbonate, fluoride, nitrate, nitrite, phosphate, phosphite, etc. The ammonium salts of organic acids are typified by ammonium formate, acetate propionate, etc. The particular source of the alcohol reactant is of no great significance insofar as this invention is concerned if the alcohol contains as contaminant minor to trace amounts of a carbonyl or carbonyl-forming compound which would include acetals. However, for the purpose of defining with more particularity some of the alcohol sources which may be employable in this reaction, reference may be had to U.S. Patent No. 2,637,746 to Parker, which describes in detail the oxo process and to a copending commonly assigned application, Serial Number 578,902, which describes one process for the preparation of alcohols via the so-called alkyl metal route.

For the purposes of this invention the ammonium ion containing compound should be present in an amount of 0.1 to 4 mole percent preferably from 1 to 2 mole percent based on alcohol. The specific weight percent of any given ammonium ion source will depend on the molecular weight of the compound. The ammonium ion source may be added to the alcohol and/or acidic component prior to the esterification or if desired during the reaction.

To demonstrate the effectiveness of ammonium ion with regard to the color of plasticizer esters, carbonyl contaminated alcohols were employed in a severe esterification process designed to magnify any tendency toward discoloration due to contaminants which may be present in the alcohol. In the following table phthalic anhydride was reacted with the alcohol specified in a mole ratio of 1:2 at 130° C. and in the presence of 1.4 wt. percent sulfuric acid based on theoretical ester for 90 minutes. Since the discoloration of the ester was substantial as a result of the severe conditions the Gardner color scale was employed. In the Gardner color scale each unit is comparable to approximately 160 on the Hazen scale. The discoloration was due principally to the carbonyl contaminants in the alcohol reactant and magnified by the conditions employed.

TABLE

*Ester quality improved by presence of ammonium ion during reaction*
[Phthalate ester preparation employing phthalic anhydride, $C_{10}$ oxo alcohol with $H_2SO_4$ catalyst.]

| Additive | Moles per 100 Grams Alcohol | Gardner (Ester) Color |
| --- | --- | --- |
| Control | 0 | 3.75 |
| $(NH_4)_2SO_4$ | 0.0023 | 1.5 |
| $H\overset{O}{\overset{\|}{C}}-O-NH_4$ | 0.0023 | <1.0 |
| $CH_3\overset{O}{\overset{\|}{C}}-ONH_4$ | 0.0023 | 1 |
| Decylamine | 0.0023 | 3.0–3.5 |
| Phenyl Hydrazine | 0.0023 | 8 |
| Hydrazine | 0.0023 | 7 |

When employing $C_{10}$ oxo alcohol without an ammonium ion source an extremely high ester color was noted. The $C_{10}$ alcohol contained .06% carbonyl as determined by carbonyl number.

The above table clearly shows that esters having a reduced color rating may be prepared even when employing alcohol reactants containing carbonyl contaminants under severe conditions including the use of concentrated sulfuric acid catalyst and allowing the reaction medium to be exposed to atmospheric conditions. This invention therefore permits the use of inexpensive processes not requiring special apparatus and as a major factor the employment of relatively inexpensive sulfuric acid in lieu of toluene or other sulfonic acids.

The esterification process to which this invention relates comprises the reaction of 2 to 2.5 moles of alcohol per mole of the desired dicarboxylic acid or anhydride in the presence of catalyst which may comprise $H_2SO_4$, toluene sulfonic acid, benzene sulfonic acid or any of the known esterification catalysts, at a temperature of about 100° to 200° C. for a period of 30 to 180 minutes. The reaction mixture may be blanketed under slight pressure by $CO_2$, $N_2$ or other inert gases to exclude oxygen although this is not necessary. The amount of catalyst employed may vary in accordance with its activity. For example, as little as .3 wt. percent on alcohol, if sulfuric acid is employed, while as much as 7.0 wt. percent and more of toluene sulfonic acid may be employed. Sulfuric acid is preferably added in an amount of 0.1 to 1.5 wt. percent on alcohol. The reaction product is then preferably washed with aqueous caustic to remove excess acidity from the catalyst employed in any unreacted acid reactant. Subsequent to the caustic wash the product is then water washed to remove water soluble impurities such as the sodium sulfate or other inorganic salt formed during the reaction. Both of these washing steps may be carried out at ambient or slightly elevated temperatures if desired.

Subsequent to the caustic and water washing procedure the product is then topped or distilled to remove remaining water and unreacted alcohol to finally recover the plasticizer ester in a relatively pure state. If desired the ester may be further treated with activated charcoal to remove any residual color-forming bodies which may be present.

The following examples illustrate the advantages resulting from the use of an ammonium ion source in esterification reactions:

EXAMPLE 1

In this control run one mole (148 grams) of phthalic anhydride was reacted with 2.2 moles (335 grams) of decyl alcohol containing minor amounts of carbonyl contaminants in the presence of 75 cc. of toluene entrainer, 1 wt. percent concentrated $H_2SO_4$ based on theoretical ester, at 120° to 160° C. for 90 minutes. The bulk of the reaction occurred at 120° C. The product was washed with 5% aqueous caustic to remove excess acidity. Subsequent to the caustic wash the product was then water washed and finally topped or distilled to remove small amounts of water and unreacted alcohol. The resulting phthalate ester had a color rating of 120 on the Hazen scale.

EXAMPLE 2

Example 1 was repeated identically employing ammonium formate in an amount of 0.46 gram, equivalent to .14 wt. percent on alcohol and representing 0.32 mole percent on alcohol. The ester product had a color of 80 on the Hazen scale.

EXAMPLE 3

Example 1 was repeated identically employing ammonium formate in an amount of 1.4 grams, equivalent to 0.42 wt. percent on alcohol and representing .96 mole percent on alcohol. The ester product had a color of 35 on the Hazen scale.

EXAMPLE 4

Example 1 was repeated identically employing ammonium formate in an amount of 2.8 grams, equivalent to 0.85 wt. percent on alcohol and representing 1.92 mole percent on alcohol. The ester product had a color of 10 on the Hazen scale.

EXAMPLE 5

Example 1 was repeated identically employing ammonium chloride in an amount of 1.08 grams, equivalent to 0.32 wt. percent on alcohol and representing .96 mole percent on alcohol. The ester product had a color of 30 on the Hazen scale.

EXAMPLE 6

Example 1 was repeated identically employing ammonium chloride in an amount of 2.16 grams, equivalent to 0.64 wt. percent on alcohol and representing 1.92 mole percent on alcohol. The ester product had a color of 10 on the Hazen scale.

EXAMPLE 7

Example 1 was repeated identically employing ammonium acetate in an amount of 3.4 grams, equivalent to 1 wt. percent on alcohol and representing 1.9 mole percent on alcohol. The ester product had a color of 10 on the Hazen scale.

EXAMPLE 8

Example 1 was repeated identically employing ammonium sulfate in an amount of 7.5 grams, equivalent to 2 wt. percent on alcohol and representing 0.96 mole percent on alcohol. The ester product had a color of 20 on the Hazen scale.

EXAMPLE 9 (CONTROL RUNS WITH P-TOLUENE SULFONIC ACID)

The esterification of Example 1 was repeated, employing in lieu of sulfuric acid, p-toluene sulfonic acid in an amount of 8.94 grams for 100 minutes at a temperature of 120° to 160° C. In this control run with p-toluene sulfonic acid catalysis the product had a color rating of 45 on the Hazen scale.

EXAMPLE 10

Example 9 was repeated employing ammonium chloride in an amount of 2.16 grams, representing 0.64 wt. percent on alcohol or 1.92 mole percent on alcohol. The final ester color was 15 on the Hazen scale.

What is claimed is:

1. In a process of preparing esters suitable for use as plasticizers wherein one mole of an acidic compound selected from the group consisting of dicarboxylic acids and their anhydrides is reacted with at least two moles of an alcohol contaminated with a compound selected from the group consisting of carbonyl, carbonyl-forming compounds and mixtures thereof, at elevated temperatures and in the presence of an esterification catalyst, the improvement which comprises carrying out the reaction in the presence of an ammonium ion source in an amount sufficient to inhibit discoloration.

2. A process in accordance with claim 1 wherein said catalyst is concentrated sulfuric acid.
3. A process in accordance with claim 2 wherein said ammonium ion source is ammonium formate.
4. A process in accordance with claim 2 wherein said ammonium ion source is ammonium chloride.
5. A process in accordance with claim 2 wherein said ammonium ion source is ammonium acetate.
6. A process in accordance with claim 2 wherein said ammonium ion source is ammonium sulfate.
7. A process in accordance with claim 2 wherein said ammonium ion source is ammonia.
8. A process in accordance with claim 1 wherein said catalyst is toluene sulfonic acid.
9. A method in accordance with claim 8 wherein said ammonium ion source is ammonium formate.
10. A method in accordance with claim 8 wherein said ammonium ion source is ammonium chloride.
11. A method in accordance with claim 8 wherein said ammonium ion source is ammonium acetate.
12. A method in accordance with claim 8 wherein said ammonium ion source is ammonium sulfate.
13. A method in accordance with claim 8 wherein said ammonium ion source is ammonia.
14. A process of preparing esters suitable for use as plasticizers wherein phthalic anhydride is reacted with at least two moles of decyl alcohol containing a contaminant selected from the group consisting of carbonyl, carbonyl-forming compounds and mixtures thereof, at a temperature of 100° to 200° C. in the presence of from 0.1 to 1.5 wt. percent of sulfuric acid and in the presence of from 0.1 to 4 mole percent of an ammonium ion source based on alcohol.

References Cited in the file of this patent

UNITED STATES PATENTS

| | | |
|---|---|---|
| 2,593,428 | Fischer et al. | Apr. 22, 1952 |
| 2,614,072 | Carlson et al. | Oct. 14, 1952 |
| 2,681,904 | Hyer et al. | June 22, 1954 |
| 2,713,075 | Doeringer | July 12, 1955 |
| 2,822,409 | Gwynn et al. | Feb. 4, 1958 |

FOREIGN PATENTS

| | | |
|---|---|---|
| 610,136 | Great Britain | Oct. 12, 1948 |